United States Patent Office 3,598,784
Patented Aug. 10, 1971

3,598,784
POLYSILOXANE AMIDES
Fred F. Holub, Schenectady, and Denis R. Pauzé, Scotia,
N.Y., assignors to General Electric Company
No Drawing. Filed Mar. 11, 1970, Ser. No. 18,724
Int. Cl. C08f *11/04*
U.S. Cl. 260—46.5                11 Claims

ABSTRACT OF THE DISCLOSURE

Polysiloxane amides and polysiloxane amide imides are obtained from the reaction of an organic diamine, a tetracarboxylic dianhydride and a polysiloxane containing terminal silicon-bonded

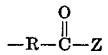

groups where R is a divalent hydrocarbon radical and Z is a halogen, or the hydroxyl radical or the —$OCH_3$ radical. The polysiloxane amide is converted to the polysiloxane amide imide by heating at elevated temperatures.

---

This invention is concerned with polysiloxane amides and polysiloxane amide imides obtained therefrom. More particularly the invention is concerned with polymeric compositions selected from the class consisting of (1) a polysiloxane amide acid (for brevity hereinafter designated as "polyamide acid") composed of recurring structural units of the formulas (a)

I
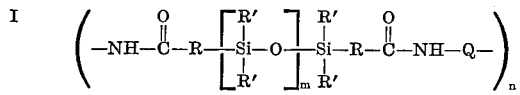

and (b)

II
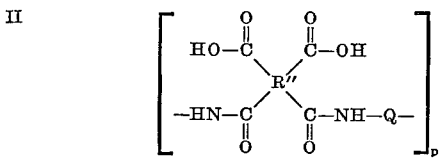

and (2) a polysiloxane amide imide (hereinafter designated as "polyamide imide") composed of recurring structural units of (a) Formula I and (b)

III
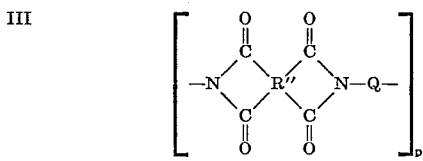

where R is a divalent hydrocarbon radical, R' is a monovalent organic radical, preferably though not exclusively selected from the class consisting of monovalent hydrocarbon radicals and halogenated monovalent hydrocarbon radicals, R" is an organic tetravalent radical preferably containing at least one ring of six carbon atoms, said ring being characterized by benzenoid unsaturation, the four carbonyl groups of each polyamide acid or polyimide unit being attached to adjacent carbon atoms in a ring of the R" radical, Q is a divalent organic radical, $m$ is a whole number equal to at least one, for example, 1 to 100 or more, and $n$ and $p$ are the same or different whole numbers greater than 1, for instance, up to 10,000 or more.

The above polyamide acids of Formula 1 are first prepared by effecting reaction between a mixture of ingredients comprising a polysiloxane of the general formula IV
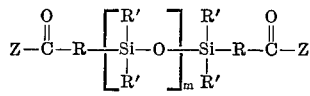

a diamino compound of formula (V)         $NH_2$—Q—$NH_2$ and a dianhydride of formula VI
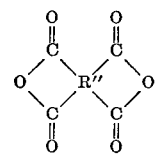

where R, R', R", Q, and $m$ have the meanings given above, and Z is a member selected from the class consisting of halogen (e.g., chlorine, bromine, fluorine, etc.), the hydroxyl radical, and the —$OCH_3$ radical. By further heating the polyamide acid, one can obtain polysiloxane amide imides composed of structural units of Formulas I and III.

The process of first preparing the polyamide acid comprises effecting reaction by mixing and stirring at least one organic diamino compound of Formula V with a reactable polysiloxane of Formula IV and at least one tetracarboxylic acid dianhydride of Formula VI, advantageously in an organic liquid which is a solvent for at least one reactant, said solvent being inert to the reactants. Preferably the reaction is conducted under anhydrous conditions for a time of the order of at least one minute at temperatures below 175° C. sufficient to provide a solution containing at least 10% solids of the corresponding polyamide acid. In determining a specific time and a specific temperature for forming the aforesaid polyamide acid, several factors should be considered. The maximum permissible temperature will depend upon the particular diamine, the dianhydride used, the particular polysiloxane of Formula IV, the particular solvent, the percent solids of polyamide acid resin which is desired in the final solution, and the minimum period of time one desires for reaction. Generally, temperatures below 100° C. are adequate for the purpose. As the temperature increases, there is a tendency for the polyamide acid to imidize therefore increasing the changes for greater insolubility of the final product in the solvent. Advantageously, to form a product of maximum degree of polymerization and yet have a satisfactory degree of solubility, the temperature employed throughout the reaction should be below 50° C., for instance, between 20–40° C.

After forming the polyamide-acid solution, the unreacted materials can be removed and the solution used as such for coating purposes, for film formation, etc. Alternatively, the polyamide-acid may also be treated to remove solvent and used as a shapeable (i.e., moldable) material. The formation of emulsions and dispersions of these polyamide acids is not precluded.

In general, the process for making the polyamide-acid involves premixing approximately equimolar amounts of the organic diamine of Formula V, the dianhydride of Formula VI, and the polysiloxane of Formula IV, and adding the mixture in small portions with agitation to the organic solvent. Dissolving the reactants in separate solvents and thereafter mixing the solutions may also be employed. Since the reaction tends to be exothermic and to accelerate quite rapidly, it is important in many instances to regulate the additions and the temperature to maintain the reaction temperature below a predetermined value, such value being based on the desirability of obtaining a certain percentage of the polyamide-acid in the final reaction product. In all instances, agitation of the reactants is advantageously employed while at the same time maintaining anhydrous conditions. The molar concentration can be varied within certain limits; generally one can employ about 1 mol of the diamino compound per mol of the total molar concentration of the dianhydride and polysiloxane compound of Formula IV combined in order to obtain a high molecular weight product. However, the use of an excess of up to 5 mol percent of the reactants combined on the above bases is not precluded. Greater molar excesses can result in reduction of the molecular weight.

The molar relationship of the dianhydride and the polysiloxane can be varied widely. Greater heat resistance and stability results if the anhydride predominates. However, one can employ, on a molar basis, from 0.1 to 10 mols or more of the dianhydride per mol of the polysiloxane of Formula IV.

The polyamide acid thus formed can be characterized by its degree of molecular weight and solubility by means of its intrinsic viscosity when measured at 30° C., at a concentration of 0.5 percent, by weight, of the polymer in a solvent such as N-methyl-2-pyrrolidone. The intrinsic viscosity of the polyamide-acid should be at least 0.1, and preferably in the neighborhood of about 0.2 to 4 or 5.

The quantity of organic solvent used in the present invention need be only that sufficient to dissolve enough of the reactants to form a medium for initiation of the reaction between the organic diamine, the dianhydride, and the polysiloxane. Generally, the solvent comprises from 10 to 90% of the total weight of all the ingredients.

In the organic diamine of the formula

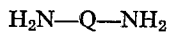

$H_2N-Q-NH_2$

Q may be any one of the following divalent organic groups: aromatic, aliphatic, cycloaliphatic, a combination of aromatic and aliphatic, heterocyclic, bridged organic radicals wherein the bridge is hydrocarbon (e.g., methylene, isopropylidene, etc.), oxygen, nitrogen, sulfur, silicon or phosphorus, or substituted groups thereof.

Included among the diamines which are suitable for use in the present invention are meta-phenylene diamine;
para-phenylene diamine;
4,4-diamino-diphenyl propane;
4,4'-diamino-diphenyl methane;
benzidine;
4,4'-diamino-diphenyl sulfide;
3,3'-diamino-diphenyl sulfone;
4,4'-diamino-diphenyl sulfone;
benzidine cyclic sulfone;
4,4'-methylene-3,3'-sulfonyl dianiline;
4,4'-diamino-diphenyl ether;
2,6-diamino pyridine;
bis-(4-amino-phenyl) diethyl silane;
bis-(4-amino-phenyl) phosphine oxide;
bis-(4-aminophenyl)-N-methylamine;
1,5-diamino-naphthalene;
3,3'-dimethyl-4,4'-diamino-biphenyl;
3,3'-dimethoxy benzidine;
2,4-bis-(beta-amino-t-butyl-phenyl) ether;
para-bis-(2-methyl-4-amino-pentyl) benzene;
para-bis-(1,1-dimethyl-5-amino-pentyl) benzene;
m-xylylene diamine;
p-xylylene diamine;
bis(para-amino-cyclohexyl) methane;
hexamethylene diamine;
hepta-methylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;

and mixtures thereof.

Among the tetracarboxylic dianhydrides which may be employed in the present invention are the many which are described in U.S. 3,179,614 which by reference is made part of the disclosure of the instant application and include, for instance pyromellitic dianhydride;
2,3,6,7-naphthalene tetracarboxylic dianhydride;
3,3'-,4,4'-diphenyl tetracarboxylic dianhydride;
1,2,5,6-naphthalene tetracarboxylic dianhydride;
1,2,3,4-cyclopentane tetracarboxylic dianhydride;
2,2'3,3'-diphenyl tetracarboxylic dianhydride;
2,2-bis(3,4-dicarboxyphenyl) propane dianhydride;
3,4-dicarboxyphenyl sulfone dianhydride;
2,3,4,5-pyrrolidine tetracarboxylic dianhydride;
3,4,9,10-perylene tetracarboxylic dianhydride;
bis(3,4-dicarboxyphenyl) ether dianhydride;
3,3',4,4'-benzophenone tetracarboxylic acid dianhydride
    (hereinafter referred to as "BPDA");
ethylene glycol bis-trimellitate dianhydride;
a dianhydride of the formula

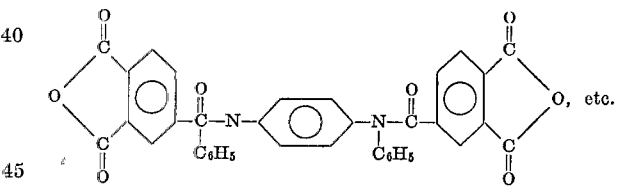

Any solvent may be employed in making the polyamide acids. The solvent should be inert to the system and should be a solvent for the reaction product, and certainly must be a solvent for at least one of the reactants and preferably for both of the reactants. Additionally, the solvent should be one which can be readily removed by volatilization and by application of reasonable amounts of heat. Among such solvents which may be mentioned are N,N-diethylformamide, N,N-diethylacetamide, N,N-dimethylmethoxy acetamide, N-methyl caprolactam, etc. Other solvents which may be used in the present invention are: N-methyl-2-pyrrolidone, tetramethylene urea, pyridine, hexamethylphosphoramide, formamide, N-methyl-formamide and N-acetyl-2-pyrrolidone. The solvents can be used alone, in combinations of solvents, or in combination with poor solvents such as benzene, benzonitrile, dioxane, butyrolactone, xylene, toluene and cyclohexane.

Among the monovalent organic radicals, for example, hydrocarbon radicals which R' may be are, for instance, alkyl radicals (e.g., methyl, ethyl, propyl, butyl, isobutyl, decyl, etc.); aryl radicals (e.g., phenyl, naphthyl, biphenyl, etc.); alkaryl radicals (e.g., tolyl, xylyl, ethylphenyl, etc.); aralkyl radicals (e.g., benzyl, phenylethyl, etc.); alkenyl radicals (e.g., vinyl, allyl, methallyl, etc.), cyanoalkyl radicals (e.g., cyanomethyl, cyanoethyl, cyanopropyl, etc.), halogenated hydrocarbons (e.g., chlorophenyl, tetrachlorobiphenyl, etc.); etc.

Among the divalent hydrocarbon divalent organic radicals which R may represent are, for instance, ethylene, trimethylene, isopropylidene

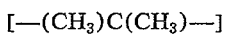

isobutylene, tetramethylene, pentamethylene, phenylene, tolylene, xylylene, biphenylene

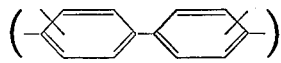

diphenylene methane (—C$_6$H$_4$—CH$_2$—C$_6$H$_4$—), diphenylene oxide

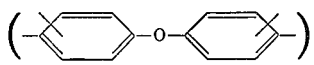

diphenylene sulfone, etc., with valences of the arylene radicals being ortho, meta, or para to each other or to connecting bonds between adjacent arylene radicals. R is preferably a divalent aliphatic hydrocarbon radical of from 2 to 6 carbon atoms.

Among the polysiloxanes corresponding to formula IV which may be employed in the practice of the present invention may be mentioned 1,3-bis (γ-carboxypropyl)-1,1,3,3-tetramethyldisiloxane; 1,3 - bis(γ - chloroformylpropyl) - 1,1,3,3, - tetramethyldisiloxane; polysiloxanes having the following formulas:

VII 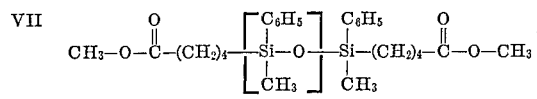

VIII 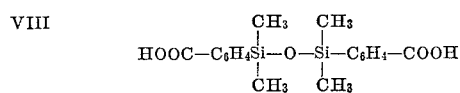

IX 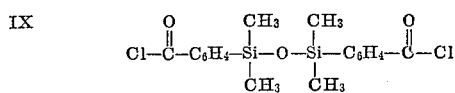

X 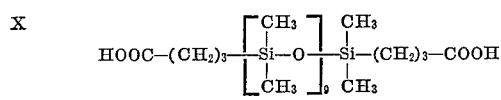

XI 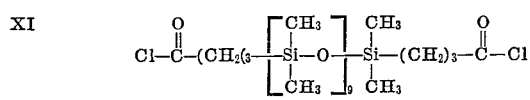

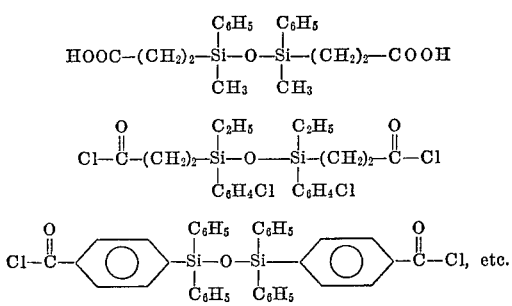

More broadly these polysiloxanes may be considered as coming within the generic formula XII 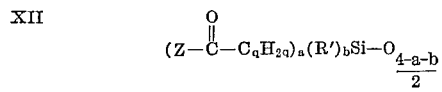

where α=0.001 to 0.1, q is at least 2 or more, e.g., 2 or 3, a+b=1.999 to 2.001, and Z and R' have the meanings above.

The compositions embraced by Formula IV can be prepared by methods well known in the art. For instance the carboxy derivatives can be prepared by the hydrolysis of the cyanoalkyl polysiloxanes as shown in U.S. Patent 2,900,363, issued Aug. 18, 1959. The acryl halides encompassed by Formula IV can be obtained from he carboxy derivative by treatment with a thinoyl halide; other means for preparing such polysiloxanes whether carboxy derivatives or the acyl halide derivatives thereof, and further examples of such compositions may be found disclosed in U.S. Patents 2,589,446, issued Mar. 18, 1952; U.S. 3,047,528 and 3,047,499, both issued July 31, 1962; U.S. 3,143,524, issued Aug. 4, 1964; U.S. 2,601,237, issued June 24, 1952; French Patent 1,158,808, etc. By reference these patents are all made part of the disclosures and teachings of the instant application as basis for the various polysiloxanes of Formula IV which can be employed as well as a basis for the means for preparing such polysiloxanes.

In order that those skilled in the art may better understand how the present invention may be practiced, the following examples are given by way of illustration and not by way of limitation. In the following examples all reactions were conducted in an inert atmosphere, namely, under nitrogen, and under anhydrous conditions.

In the following examples, the cut-through temperature of certain samples were determined. This cut-through temperature is the temperature at which the enamel wire separating two magnet wires crossed at 90° and supporting a given load on the upper wire flows sufficiently to establish electrical contact between two conductors. Since magnet wires in electrical apparatus may be under compression, it is important that the wires be resistant to softening by high temperatures so as to prevent short circuits within the apparatus. The tests are conducted by placing two eight inch lengths of enameled wire perpendicular to each other under a load of 1000 grams at the intersection of the two wires. A potential of 110 volts A.C. is applied to the end of each wire and a circuit which contains a suitable indicator such as a buzzer or neon lamp is established between the ends of the wires. The temperature of the crossed wires and the load is then increased at the rate of 3 degrees per minute until the enamel softens sufficiently so that the bare conductors come into contact with each other and cause the neon lamp or buzzer to operate.

The temperature at which this circuit is established is measured by a thermocouple extending into a thermowell to a point directly under the crossed wires. The cut-through temperature is taken as the temperature in the thermowell at the moment when the current first flows through the crossed wires.

EXAMPLE 1

A solution was prepared of 68 grams N-methyl-2-pyrrolidone and 9.9 grams (0.05 mol) p,p'-methylenedianiline. While this solution was stirred, 12.08 grams (0.0375 mol) BPDA and 4.30 grams (0.0125 mol) 1,3-bis(γ-chloroformylpropyl)-1,1,3,3 - tetramethyldisiloxane were added. The temperature of the mixture rose to 60° C. and thereafter the mixture was stirred for about two hours to give a viscous solution. The solution was then precipitated by slow addition into a mechanical blender containing water. The precipitate which formed was filtered, washed twice with water and dried in vacuum at 100° C. for about two hours to give a finely divided powder. This product was a polyamide acid composed of recurring structural units of the formulas

XIII

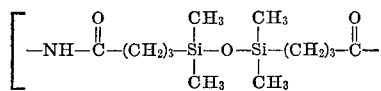

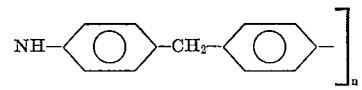

and

XIV

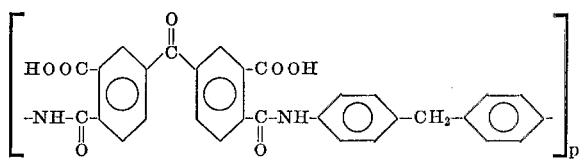

where $n$ and $p$ are whole numbers in excess of 1. A 20% solids solution in N-methyl-2-pyrrolidone was prepared from this polymer and the film was cast on an aluminum substrate which was previously treated with trichlorobiphenyl. The film was then cured under nitrogen at 100° C. for one hour, at 150° C. for one hour, at 200° C. for one hour and then at 250° C. for one-half hour. This yielded a clear, flexible, strong film which had a cut-through temperature of 355° C. This product was a polyamide imide composed of recurring structural units of Formula XIII and of units of the formula

XV

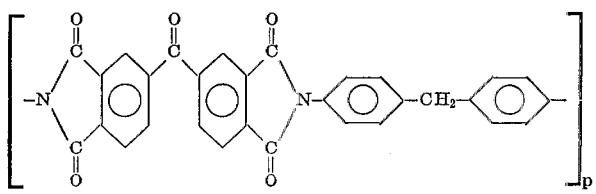

where $n$ and $p$ have the meanings given above.

EXAMPLE 2

A solution was prepared of 148 grams N-methyl-2-pyrrolidone and 15.84 grams (0.08 mol) p,p'-methylenedianiline. While stirring the solution, 19.32 grams (0.06 mol) BPDA and 1.87 grams (0.02 mol) of the bis-acid chloride corresponding to Formula XI were added. After stirring for two hours the solution was precipitated by slowly adding it to a mechanical blender containing water. The resulting precipitate was filtered, washed in water for about 18 hours, filtered again and air dried. This yielded a polyamide acid composed of recurring structural units of the formula

XVI

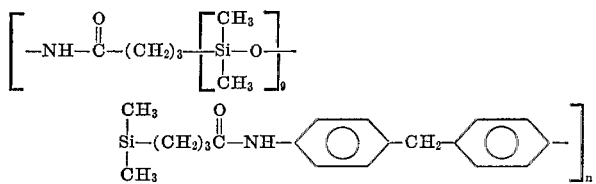

and units of Formula XIV, where $n$ and $p$ are whole numbers in excess of 1. A solution in the form of a 20% solids solution was prepared from this polymer in N-methyl-2-pyrrolidone and a film was cast on an aluminum substrate in the same manner as in Example 1 and heat-cured using the same cycle to give a clear, flexible, film which had the good heat resistance and cut-through temperature. This product was a polyamide imide composed of recurring structural units of Formula XVI and units of Formula XV.

EXAMPLE 3

A polyamide acid was prepared similarly as in Example 2 with the exception that the molar ratio of the ingredients was 2 mols of p,p'-methylenedianiline, 1 mol of the BPDA and 1 mol of the polysiloxane corresponding to Formula XI. This yielded a polysiloxane amide acid composed of units of Formula XVI and units of Formula XIV. When this polyamide acid was heated similarly as in Example 2 in the form of a cast film on an aluminum substrate, a clear, flexible, heat-resistant film was obtained which comprised a polyamide imide composed of recurring structural units of Formula XVI and units of Formula XV.

EXAMPLE 4

Example 1 was repeated exactly with the exception that the molar ratio of ingredients was 2 mols of the p,p'-methylenedianiline, 1 mol of the BPDA and 1 mol of the 1,3-bis(γ-chloroformylpropyl)-1,1,3,3-tetramethyldisiloxane. This yielded a polymer composed of recurring structural units of the same kind as in Example 1; when this polyamide acid was heated at elevated temperatures using the same curing cycle as in Example 1, a polyamide imide was obtained with the same recurring units but with different molar concentrations of these units as compared to the polyamide imide of Example 1.

EXAMPLE 5

When Example 1 is repeated with the exception that an equivalent molar concentration of pyromellitic anhydride is substituted for the BPDA, a polyamide acid is obtained composed of recurring structural units of Formula XIII and recurring structural units having the formula

XVII

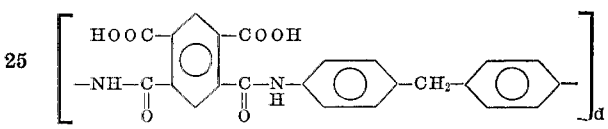

where $p$ is a whole number in excess of 1.

EXAMPLE 6

Employing the same conditions as in Example 1, a polysiloxane amide was prepared from 103.0 grams N-methyl-2-pyrrolidone, 9.9 grams (0.05 mol) p,p'-methylenedianiline, 12.08 grams (0.0375 mol) BPDA and 3.82 grams (0.0125 mol) 1,3 - bis(γ - carboxypropyl)-1,1,3,3-tetramethyldisiloxane. During the initial mixture of the ingredients (before addition of the disiloxane) the reaction product exothermed to around 41° C. After stirring for a total of about 1½ hours, a polysiloxane amide solution was obtained composed of recurring structural units of Formulas XIII and XIV. A film was cast and cured similarly as in Example 1 to give a flexible polysiloxane amide imide film which had good cut-through temperatures and a corona resistance which was considerably better than a similar polymeric film made from the same ingredient but omitting the aforesaid disiloxane.

EXAMPLE 7

When the same conditions as in Example 1 are employed wherein 19.8 grams (0.1 mol) p,p'-methylene dianiline is dissolved in 143 grams of N-methyl-2-pyrrolidone and the contents are then stirred while adding 8.12 grams (0.04 mol) isophthaloyl chloride, 12.88 grams (0.04 mol) BPDA and 6.86 grams (0.02 mol) 1,3-bis(γ-chloroformylpropyl)-1,1,3,3-tetramethyldisiloxane, and the polyamide acid reaction product is then isolated and dissolved in N-methyl-2-pyrrolidone in the same manner as in Example 1, and the solution cast as a film on an aluminum substrate and cured for the same cure cycle as described in the aforementioned Example 1, there is obtained a clear, flexible film having good cut-through characteristics. Prior to the heat-curing cycle, the polymer is composed of recurring structural units of Formulas XIII, XIV and

XVIII

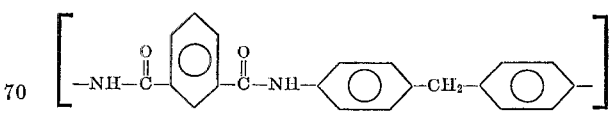

where $p$ is a whole number in excess of 1. The heat-cured product formed the corresponding polyamide imide wherein the imide-containing units were derived from imidization of recurring unit of Formula XIV.

The polyamide acid compositions herein described, whether in solution form or in the solvent-free form, are shapeable either after depositing from the solvent or by molding techniques and can be made into films, filaments, tubings, etc. Thereafter by heating these polyamide compositions at temperatures ranging from about 150 to 300° C. for times in the order from 15 minutes to several hours or more, one forms the polysiloxane amide imide structure which is substantially infusible and insoluble. Obviously, the polyimide structures have properties which are even more desirable than the polyamide acids because of their infusibility and insolubility. However, the fact that the polyamide-acid resins are in an intermediate state of polymerization and therefore are soluble and shapeable, makes these compositions useful for a number of applications.

Thus, the polyamide-acid solutions can be applied to substrates, for example, metals (such as copper, brass, aluminum, steel, etc.) in the form of sheets, fibers, wires, screening, etc.; glass in the form of sheets, fibers, foams, fabrics, etc.; polymeric materials, for example, cellulosic materials such as wood, paper, etc.; polyolefins, such as polyethylene, polypropylene, polystyrene; polyesters, such as polyethylene terephthalate, etc.; perfluorocarbon polymers, such as polytetrafluoroethylene, copolymers of tetrafluoroethylene with hexafluoropropylene, etc.; polyurethanes, all polymeric materials in the form of sheets, fibers, foams, woven and non-woven fabrics, screening, etc.; leather, sheets, etc. Thereafter the polyamide-acid resin can be converted by the usual heat treatment to the polyimide structure with its improved physical and thermal properties.

Polyimide films and sheets made in accordance with our invention are especially useful in high temperature applications where resistance to solvents and high temperatures are a requirement. Thus, such films can be employed as a means for packaging and protective applications. Additionally, polymers and film-forming polymers herein described may be used in high temperature electrical applications, such as for slot liners, in transformer and capacitor applications, cable wrappings, etc. Finally, the structures made of the polyamide-acid polymers themselves or solutions of the latter, may be employed to treat various fibrous sheets which could then be heated to remove solvent (if present) and thereafter superimpose the sheets and heat them at elevated temperatures under pressure to convert the polyamide-acid resin to the polyimide state and form a tough, infusible and insoluble laminate highly resistant to heat. Fibers prepared from the polyamide-acid resin and ultimately converted to the polyimide state offer use for high temperature electrical insulation, protective clothing, filtration media, packing materials, brake linings, etc.

It will, of course, be apparent to those skilled in the art that in addition to the tetracarboxylic acid dianhydrides employed in the foregoing examples, other dianhydrides can be used, examples of which have been recited previously, without departing from the scope of the invention. In addition, other organic diamines and polysiloxanes of Formula IV (including polysiloxanes containing terminal carboxy or —OCH₃ groupings in place of the

end grouping, many examples of which have been given above, can be used in place of the organic diamine and polysiloxanes in the preceding examples with equal facility. Mixtures of dianhydrides as well as mixtures of organic diamines and mixtures of polysiloxanes can be employed to give new and useful products which in turn can be converted to heat-resistant, strong, flexible films, fibers or other products.

What we claim as new and desire to secure by Letters Patent of the United States is:

1. Polymeric compositions selected from the class consisting of (1) polysiloxane amide acids composed of recurring structural units of the formulas (a)

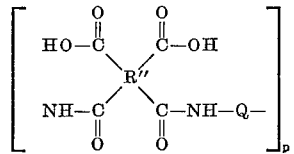

and (b)

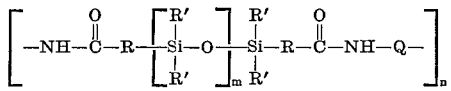

and (2) polysiloxane amide imides composed of recurring structural units of (a)

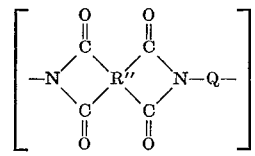

and (b) units defined in (1)(b), where Q is a divalent organic radical and R is a divalent hydrocarbon radical, R' is a monovalent organic radical selected from the class consisting of monovalent hydrocarbon, monovalent halogenated hydrocarbon, and cyanoalkyl radicals, R" is an organic tetravalent radical containing at least one ring of six carbon atoms, said ring characterized by benzenoid unsaturation, the four carbonyl groups being attached directly to separate carbon atoms in a ring, each pair of carbonyl groups being attached to adjacent carbon atoms in a ring of the R" radical, m is an integer equal to from 1 to 100, and n and p are whole numbers greater than 1.

2. A polyamide acid as in claim 1 composed of recurring structural units of the formulas (a)

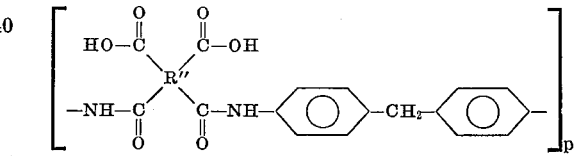

and (b)

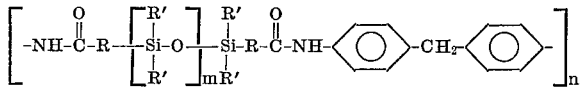

where R is a divalent hydrocarbon radical, R' is a monovalent organic radical selected from the class consisting of monovalent hydrocarbon, monovalent halogenated hydrocarbon, and cyanoalkyl radicals, R" is an organic tetravalent radical containing at least one ring of six carbon atoms, said ring characterized by benzenoid unsaturation, the four carbonyl groups being attached directly to separate carbon atoms in a ring, each pair of carbonyl groups being attached to adjacent carbon atoms in a ring of the R" radical, m is a whole number equal to from 1 to 100, and n and p are integers greater than 1.

3. A polyimide as in claim 1 composed of recurring structural units of the formulas (a)

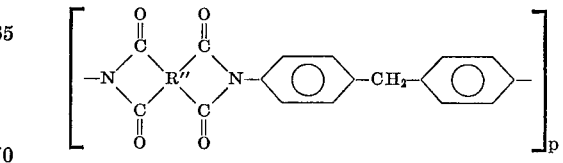

and (b)

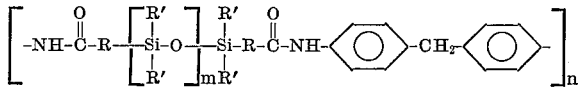

where R is a divalent hydrocarbon radical, R' is a monovalent organic radical selected from the class consisting of monovalent hydrocarbon, monovalent halogenated hydrocarbon, and cyanoalkyl radicals, R" is an organic tetravalent radical containing at least one ring of six carbon atoms, said ring characterized by benzenoid unsaturation, the four carbonyl groups being attached directly to separate carbon atoms in a ring, each pair of carbonyl groups being attached to adjacent carbon atoms in a ring of the R" radical, $m$ is a whole number equal to from 1 to 100, and $n$ and $p$ are integers greater than 1.

4. A polysiloxane amide acid of claim 1 composed of recurring structural units of the formula $$\left[\begin{array}{c}\text{HO-C} \quad \text{C-} \quad \text{C-OH} \\ \text{-NH-C} \quad \quad \text{C-NH-} \bigcirc -\text{CH}_2- \bigcirc -\end{array}\right]_p$$

and $$\left[-\text{NH}-\overset{\text{O}}{\overset{\|}{\text{C}}}-(\text{CH}_2)_3-\overset{\text{CH}_3}{\underset{\text{CH}_3}{\text{Si}}}-\text{O}-\overset{\text{CH}_3}{\underset{\text{CH}_3}{\text{Si}}}-(\text{CH}_2)_3-\overset{\text{O}}{\overset{\|}{\text{C}}}-\text{NH}-\bigcirc-\text{CH}_2-\bigcirc-\right]_n$$

where $n$ and $p$ are whole numbers in excess of 1.

5. A polysiloxane amide acid of claim 1 composed of recurring structural units of the formulas $$\left[\begin{array}{c}\text{HO-C} \quad \text{C-} \quad \text{C-OH} \\ \text{-NH-C} \quad \quad \text{C-NH-} \bigcirc -\text{CH}_2- \bigcirc -\end{array}\right]_p$$

$$\left[-\text{NH}-\overset{\text{O}}{\overset{\|}{\text{C}}}-(\text{CH}_2)_3-\left[\overset{\text{CH}_3}{\underset{\text{CH}_3}{\text{Si}}}-\text{O}\right]_9 \overset{\text{CH}_3}{\underset{\text{CH}_3}{\text{Si}}}-(\text{CH}_2)_3-\overset{\text{O}}{\overset{\|}{\text{C}}}-\text{NH}-\bigcirc-\text{CH}_2-\bigcirc-\right]_n$$

where $n$ and $p$ are whole numbers in excess of 1.

6. A polysiloxane amide imide of claim 1 composed of recurring structural units of the formulas $$\left[-\text{NH}-\overset{\text{O}}{\overset{\|}{\text{C}}}-(\text{CH}_2)_3-\overset{\text{CH}_3}{\underset{\text{CH}_3}{\text{Si}}}-\text{O}- \overset{\text{CH}_3}{\underset{\text{CH}_3}{\text{Si}}}-(\text{CH}_2)_3-\overset{\text{O}}{\overset{\|}{\text{C}}}-\text{NH}-\bigcirc-\text{CH}_2-\bigcirc-\right]_n$$

and $$\left[-\text{N} \underset{\underset{\text{O}}{\text{C}}}{\overset{\overset{\text{O}}{\text{C}}}{\diagdown}} \bigcirc -\text{C-}\bigcirc \underset{\underset{\text{O}}{\text{C}}}{\overset{\overset{\text{O}}{\text{C}}}{\diagup}} \text{N-}\bigcirc-\text{CH}_2-\bigcirc-\right]_p$$

where $n$ and $p$ are whole numbers in excess of 1.

7. A polysiloxane amide imide of claim 1 composed of recurring structural units of the formulas $$\left[-\text{NH}-\overset{\text{O}}{\overset{\|}{\text{C}}}-(\text{CH}_2)_3-\left(\overset{\text{CH}_3}{\underset{\text{CH}_3}{\text{Si}}}-\text{O}\right)_9 \overset{\text{CH}_3}{\underset{\text{CH}_3}{\text{Si}}}-(\text{CH}_2)_3-\overset{\text{O}}{\overset{\|}{\text{C}}}- \text{NH}-\bigcirc-\text{CH}_2-\bigcirc-\right]_n$$

and $$\left[-\text{N} \underset{\underset{\text{O}}{\text{C}}}{\overset{\overset{\text{O}}{\text{C}}}{\diagdown}} \bigcirc -\text{C-}\bigcirc \underset{\underset{\text{O}}{\text{C}}}{\overset{\overset{\text{O}}{\text{C}}}{\diagup}} \text{N-}\bigcirc-\text{CH}_2-\bigcirc-\right]_p$$

where $n$ and $p$ are whole numbers in excess of 1.

8. The process for preparing the polysiloxane amide acids of claim 1 which comprises (a) forming a mixture of ingredients comprising (1) a diamino compound of formula $$\text{H}_2\text{N—Q—NH}_2$$

(2) a dianhydride of the formula $$\underset{\text{O}}{\overset{\text{O}}{\underset{\|}{\text{C}}}}\diagdown_{\text{O}}\diagup\underset{\|}{\overset{\|}{\text{C}}}\text{R}''\underset{\|}{\overset{\|}{\text{C}}}\diagdown_{\text{O}}\diagup\underset{\|}{\overset{\|}{\text{C}}}\overset{\text{O}}{\|}$$

and (3) a polysiloxane of the formula $$\text{Z}-\overset{\text{O}}{\overset{\|}{\text{C}}}-\text{R}-\left[\overset{\text{R}'}{\underset{\text{R}'}{\text{Si}}}-\text{O}\right]_m \overset{\text{R}'}{\underset{\text{R}'}{\text{Si}}}-\text{R}-\overset{\text{O}}{\overset{\|}{\text{C}}}-\text{Z}$$

and (b) heating the mixture of ingredients at a temperature below 175° C. until there is obtained a polyamide acid composed of the recurring structural units of the formulas (a)

$$\left[-\text{NH}-\overset{\text{O}}{\overset{\|}{\text{C}}}-\text{R}-\left[\overset{\text{R}'}{\underset{\text{R}'}{\text{Si}}}-\text{O}\right]_m \overset{\text{R}'}{\underset{\text{R}'}{\text{Si}}}-\text{R}-\overset{\text{O}}{\overset{\|}{\text{C}}}-\text{NH}-\text{Q}-\right]_n$$

and (b)

$$\left[\begin{array}{c}\text{HO-C} \quad \quad \text{C-OH} \\ \diagdown \text{R}'' \diagup \\ -\text{NH-C} \quad \quad \text{C-NH-Q-} \\ \overset{\|}{\text{O}} \quad \quad \overset{\|}{\text{O}}\end{array}\right]_p$$

where R is a divalent hydrocarbon radical, R' is a monovalent organic radical selected from the class consisting of monovalent hydrocarbon, monovalent halogenated hydrocarbon, and cyanoalkyl radicals, R" is an organic tetravalent radical preferably containing at least one ring of six carbon atoms, said ring being characterized by benzenoid unsaturation, the four carbonyl groups of each polyamide acid being attached directly to separate carbons in a ring, each pair of carbonyl groups being attached to adjacent carbon atoms in a ring of the R" radical, Z is a member selected from the class consisting of chlorine, the —OH radical, and the —OCH$_3$ radical, Q is a divalent organic radical, $m$ is a whole number equal to from 1 to 100, and $n$ and $p$ are whole numbers greater than 1.

9. The process as in claim 8 wherein the organic diamino compound is p,p'-methylene dianiline.

10. The process as in claim 8 wherein the dianhydride is benzophenone tetracarboxylic acid dianhydride.

11. The process as in claim 8 wherein the formed polysiloxane amide acid is subsequently heated at elevated temperatures sufficiently high to convert the latter to a polysiloxane amide imide composed of recurring structural units of the formulas

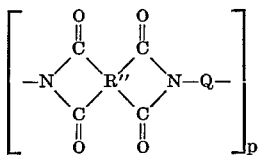

and

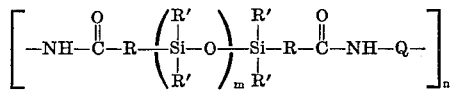

where R, R', R", Q, m, n, and p have the meanings given above in claim 8.

References Cited

UNITED STATES PATENTS 3,392,144    7/1968    Holub _____ 260—46.5
3,435,002    3/1969    Holub _____ 260—46.5

DONALD E. CZAJA, Primary Examiner
M. I. MARQUIS, Assistant Examiner

U.S. Cl. X.R.

117—124F, 126GN, 138.8E, 138.8D, 138.8F, 138.8UF, 142R, 148R, 155R; 161—206R; 252—63.7R; 260—30.4SB, 32.4R, 32.6R, 32.8SB, 33.6SB, 46.5G, 65R, 78TF